Jan. 2, 1951  P. J. BROWNSCOMBE  2,536,156
CAMERA HAVING EDGE GRIP FILM FEED
Filed Dec. 13, 1946  7 Sheets-Sheet 1
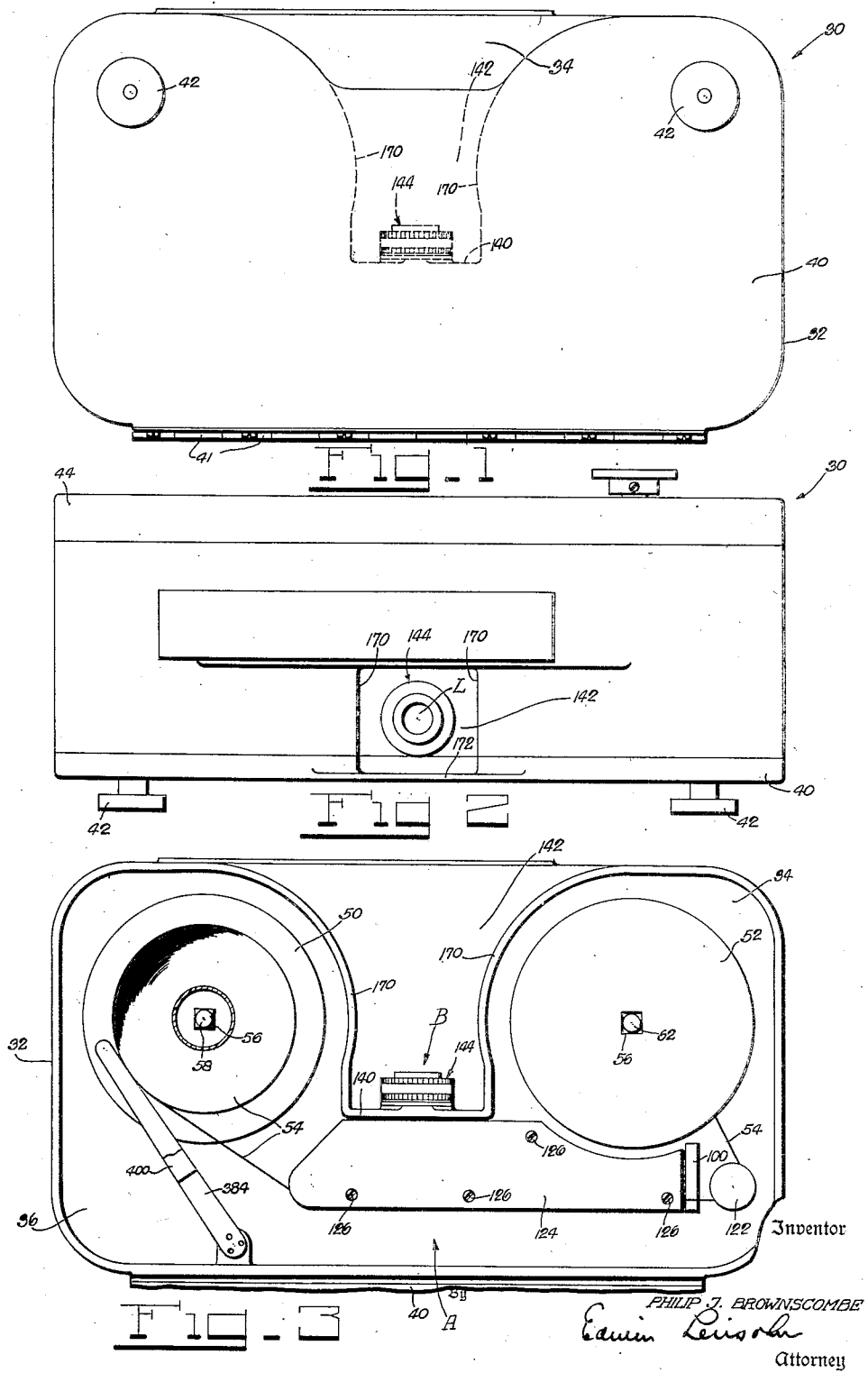
Inventor
PHILIP J. BROWNSCOMBE
Edwin Leisohn
Attorney

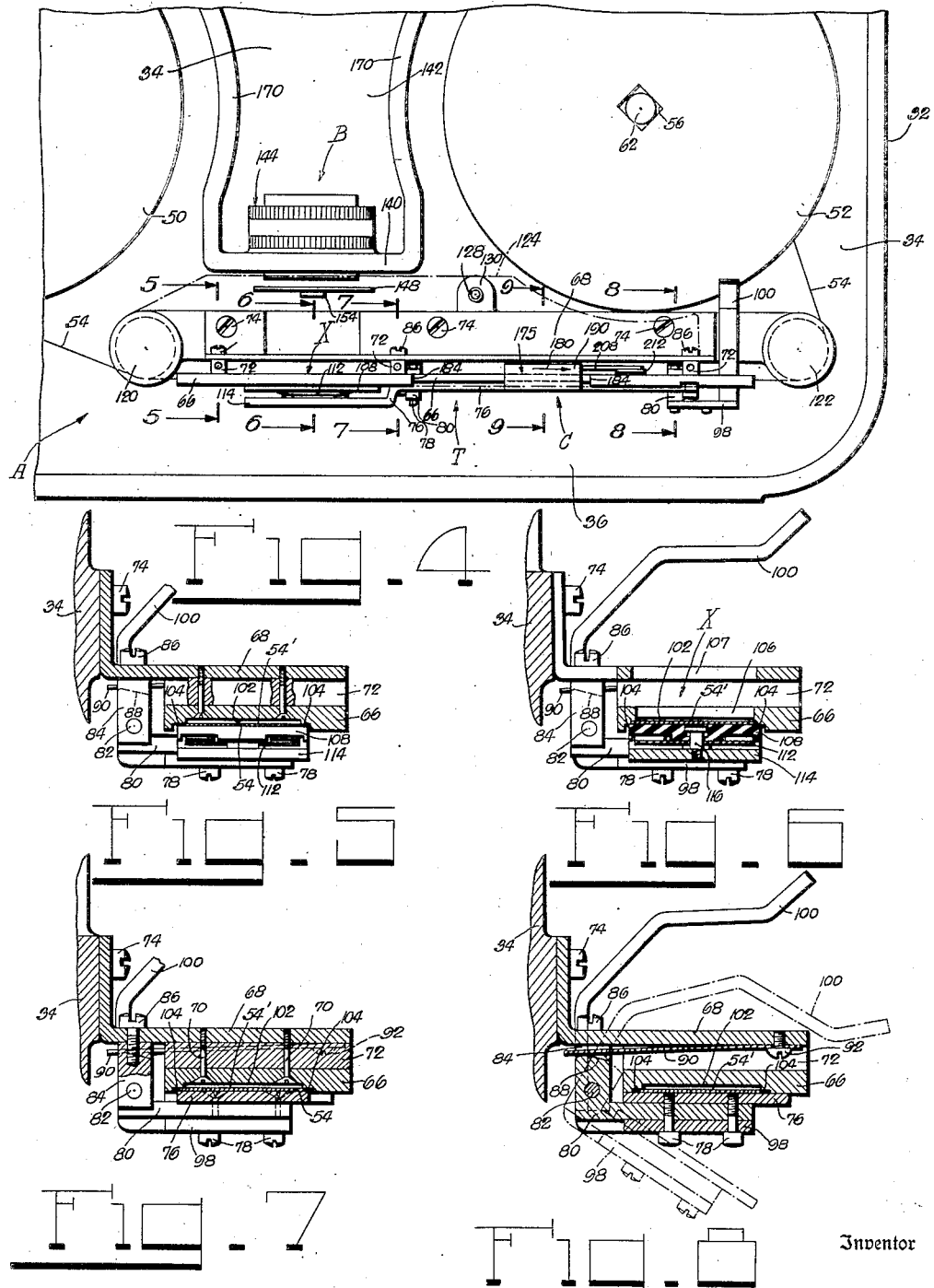

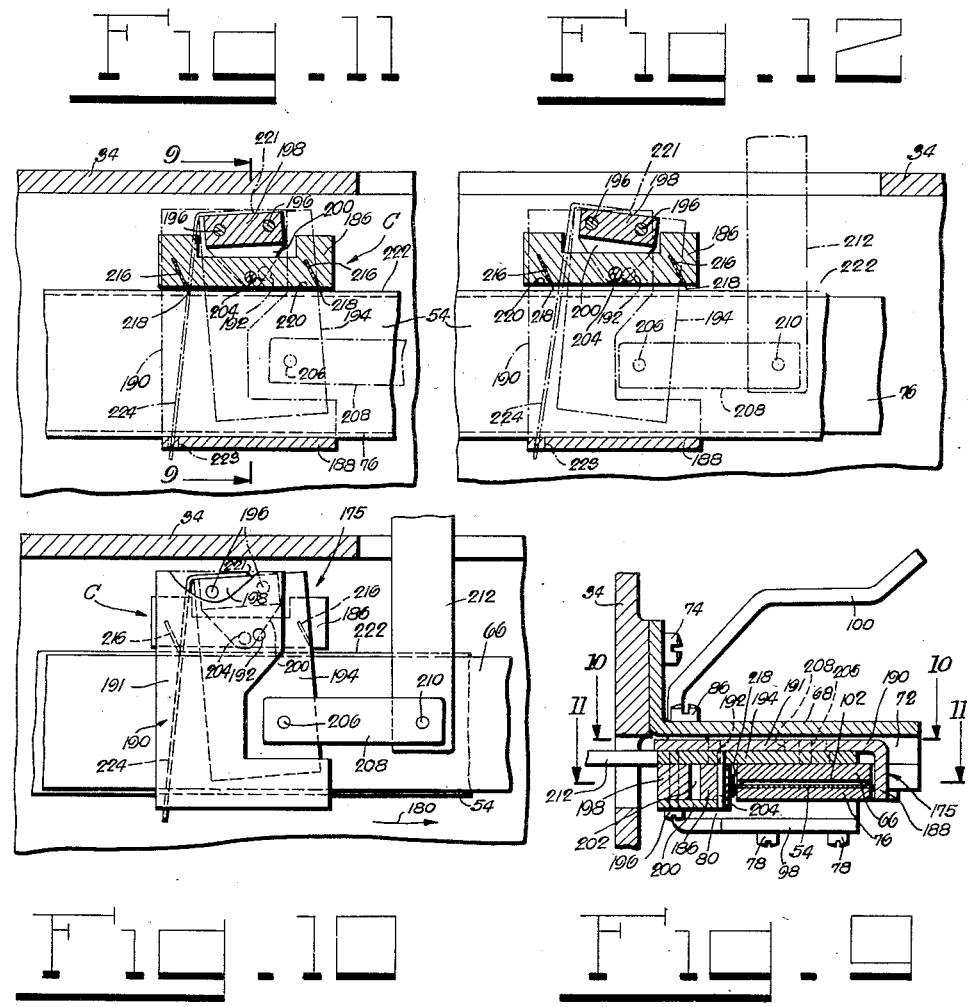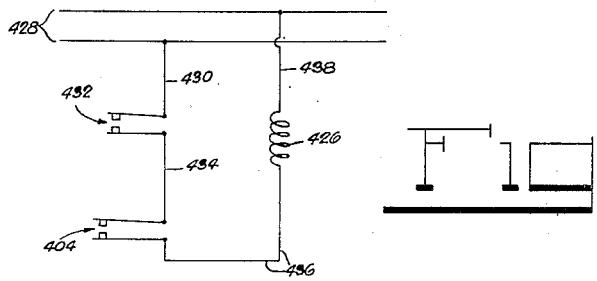

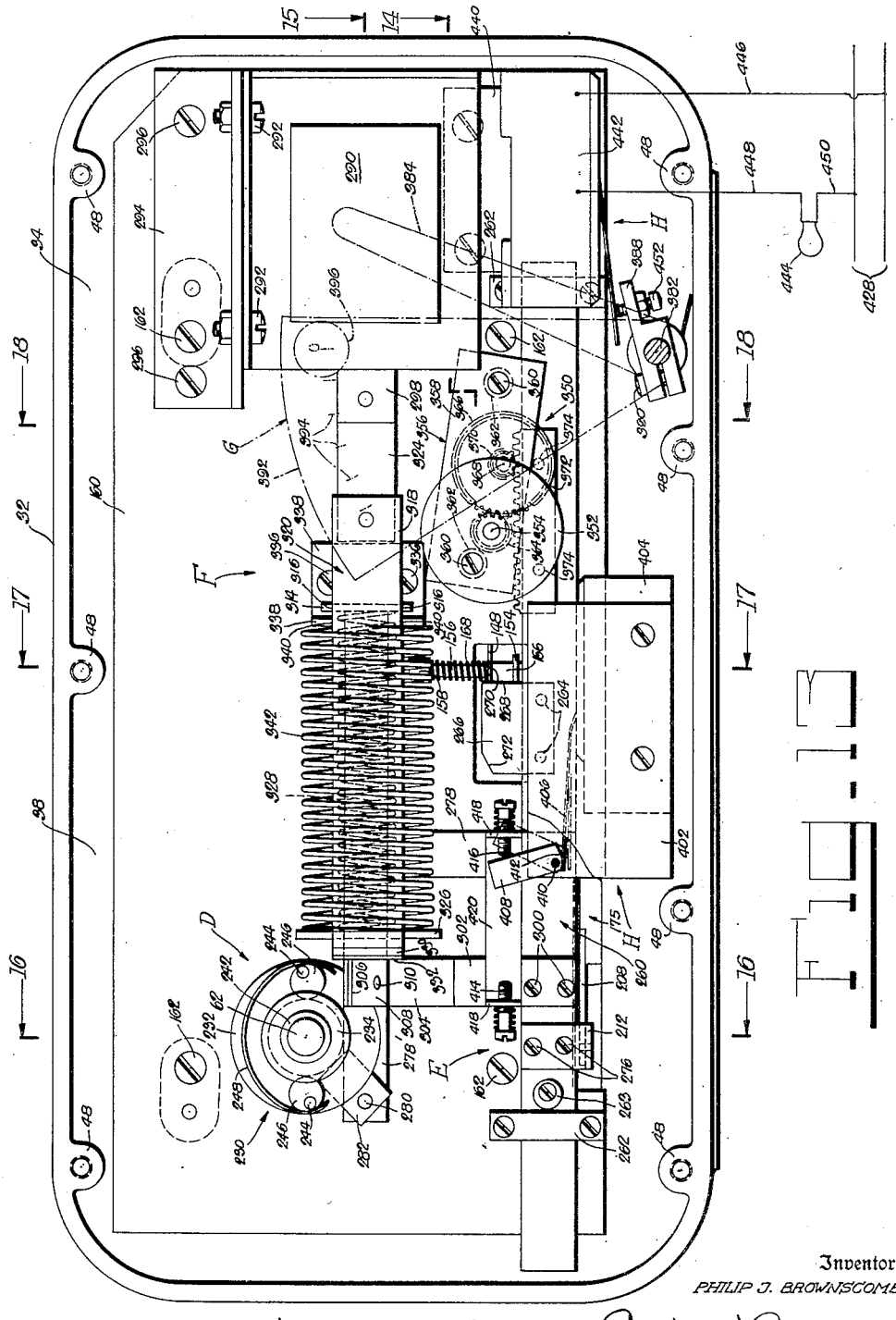

Jan. 2, 1951 P. J. BROWNSCOMBE 2,536,156
CAMERA HAVING EDGE GRIP FILM FEED
Filed Dec. 13, 1946 7 Sheets-Sheet 5
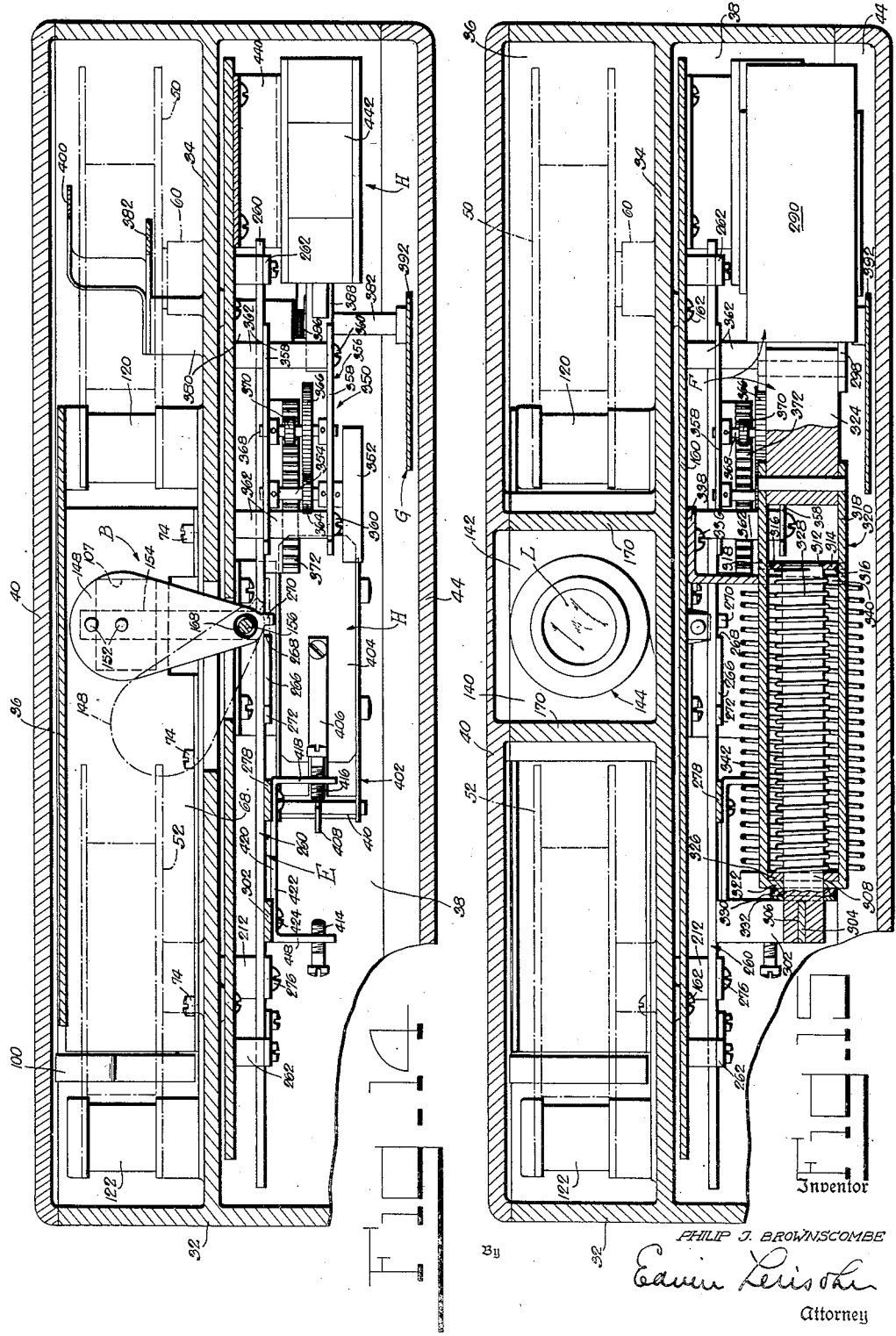
Inventor
PHILIP J. BROWNSCOMBE
By
Attorney Jan. 2, 1951　　　　P. J. BROWNSCOMBE　　　　2,536,156
CAMERA HAVING EDGE GRIP FILM FEED
Filed Dec. 13, 1946　　　　　　　　　　　　　　7 Sheets-Sheet 6

Inventor
PHILIP J. BROWNSCOMBE
By Edwin Lewisohn
Attorney

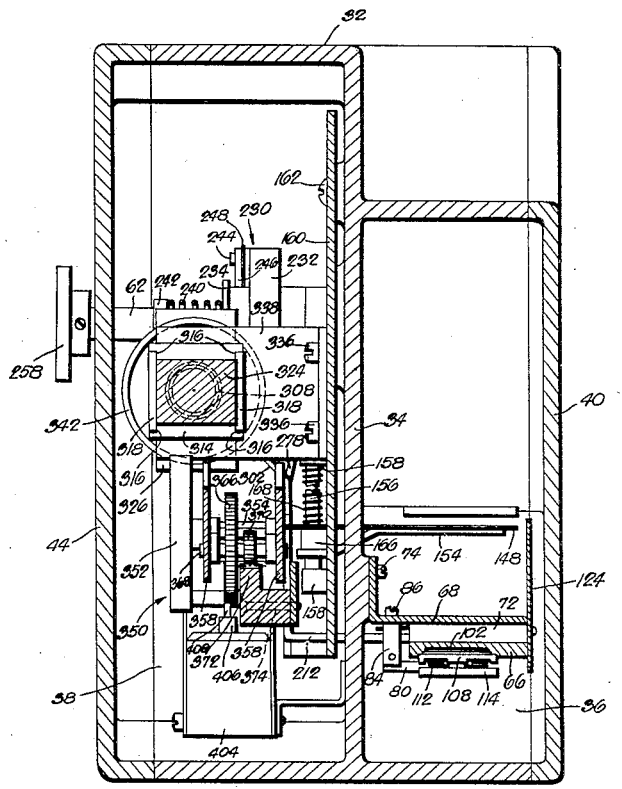
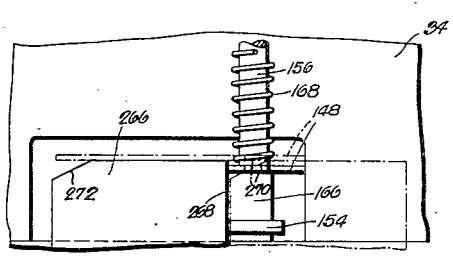

Patented Jan. 2, 1951

2,536,156

UNITED STATES PATENT OFFICE 2,536,156

CAMERA HAVING EDGE GRIP FILM FEED

Philip J. Brownscombe, Chatham, N. J., assignor to Griscombe Corporation, Newark, N. J., a corporation Application December 13, 1946, Serial No. 716,033

9 Claims. (Cl. 95—31)

This invention relates to film cameras, and more particularly to a camera for recording, in reduced size and on a long strip of film, photographic images of small objects, printed matter, drawings, and the like.

Photographic records on a film of a large volume of business correspondence and other papers of every description, are particularly important for security purposes in case of loss of an original or originals, or for conserving filing space, or for inspecting or consulting anyone of a large number of photographic records which may be held far more readily accessible than the originals and which may quickly and conveniently be viewed in a conventional reader at an enlarged scale at which they are readily discernible.

It is the primary aim and object of the present invention to provide a camera of this type which is of compact and rugged construction and automatic in its operation, and which is particularly well suited for the purpose in mind and ready for instant use at any time.

It is another important object of the present invention to design the camera so that the photographic records made thereby are to all appearances non-distorted and true reproductions at a reduced scale of the originals, while permitting the camera to be placed closer to an original to be photographed than was heretofore possible with other cameras.

It is another important object of the present invention to adapt the camera for operation with non-perforated film and to utilize the entire width of the film as recording area, as well as to feed the film past the objective lens for successive photographic recordings without contacting the sensitized face of the film in any way.

It is another important object of the present invention to provide the camera with a straight-line motion actuator for the various operating devices of the camera, such as a shutter, a film feed, a film take-up reel, and a cycle-speed regulator, and to have recourse to a simple and economically operated solenoid as the prime mover for this actuator.

It is another important object of the present invention to interpose in the drive between the actuator and the operating solenoid core a motion-delaying device which, on energization of the solenoid, permits instant and quick travel of the solenoid core through its full inward or work stroke, while delaying the transmission of its motion to the actuator, so that this device not only acts as a cycle-speed controller to afford the various operating devices of the camera ample time properly to perform their respective functions, but also prevents a slow electro-magnetic inward pull, and hence overheating, of the solenoid core.

It is another object of the present invention to incorporate in the camera a graduated film-supply indicator, and combine therewith a controller for a warning system which draws attention to an exhausted film supply in the camera by a more readily discernible medium than the graduations of the film-supply indicator, however legible these may be.

The above and other objects, features and advantages of the present invention will be fully understood from the following description, reference being had to the accompanying illustrative drawings.

In the drawings:

Fig. 1 is a reduced front elevation of a camera embodying the present invention;

Fig. 2 is a top plan view of the camera;

Fig. 3 is a view into the camera after the front cover thereof has been opened;

Fig. 4 shows, at approximately full scale, a portion of the inside of the camera as shown in Fig. 3, after removal, however, of a shield for better illustration of certain parts normally hidden thereby.

Figs. 5 to 8, inclusive, are enlarged fragmentary sections taken on the lines 5—5, 6—6, 7—7 and 8—8, respectively, of Fig. 4;

Fig. 9 is an enlarged fragmentary section taken on the line 9—9 of Figs. 4 and 11;

Fig. 10 is a fragmentary section taken on the line 10—10 of Fig. 9;

Fig. 11 is a fragmentary section taken on the line 11—11 of Fig. 9;

Fig. 12 is a section similar to Fig. 11, showing the parts in a different operating position, however;

Fig. 13 is an approximately full-scale rear-elevational view of the camera after the removal of a back cover therefrom;

Fig. 13A is a wiring diagram showing the circuit of a certain electrical instrumentality in the camera.

Figures 16, 17:
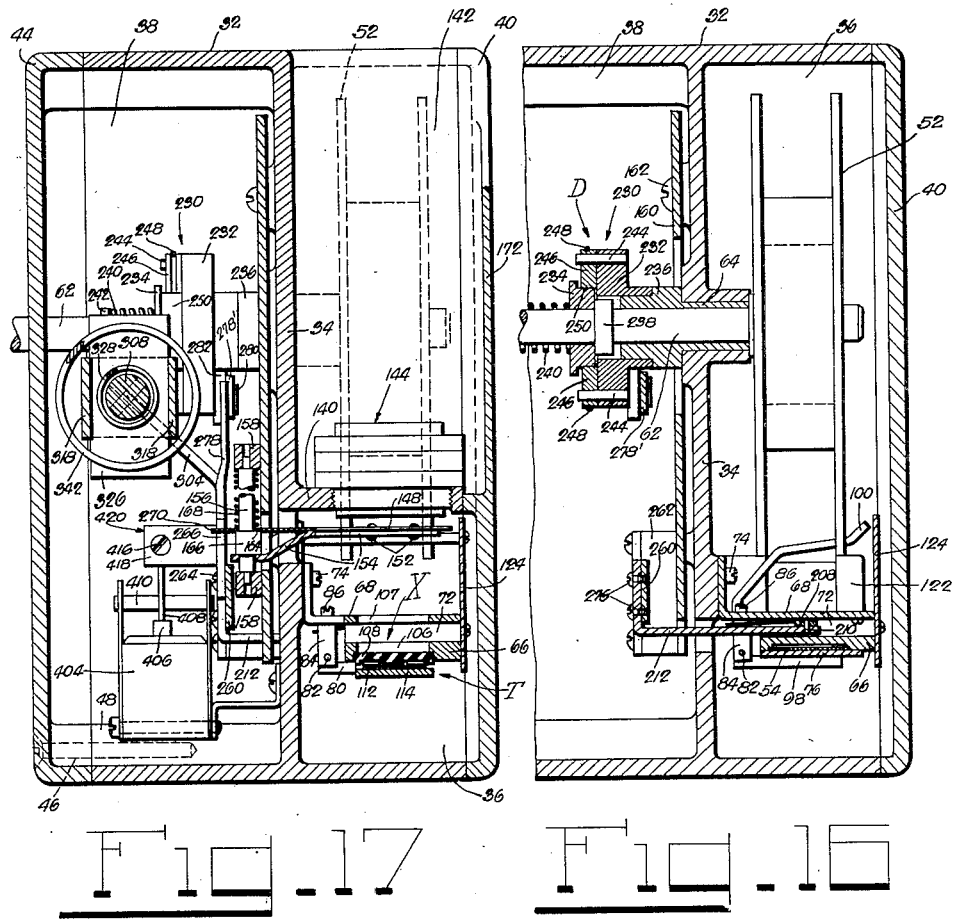
Figure 19:
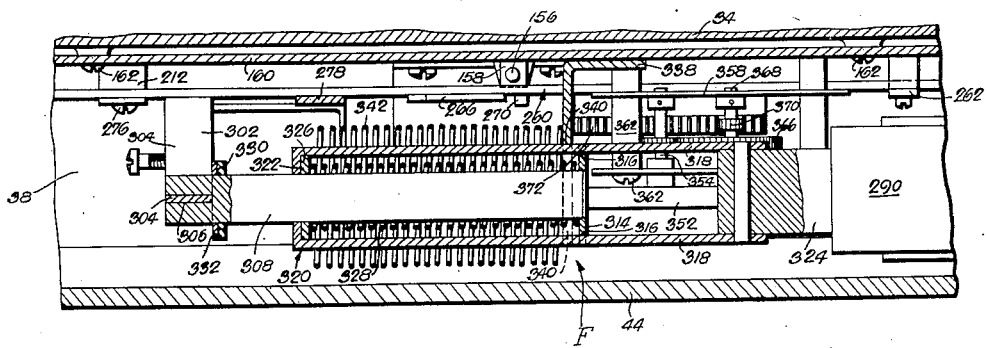

Figs. 14 and 15 are longitudinal sections through the camera, taken substantially on the lines 14—14 and 15—15, respectively, of Fig. 13;

Figs. 16, 17 and 18 are transverse sections through the camera, taken substantially on the lines 16—16, 17—17 and 18—18, respectively, of Fig. 13;

Fig. 19 is a fragmentary section similar to Fig. 15, showing certain parts of the camera in different operating positions, however; and Fig. 20 is an enlarged, fragmentary front-elevational view of one of the operating devices shown in Fig. 13;

The present camera 30 comprises a casing 32, which may be in the form of a metal casting, and which is provided with a longitudinal partition 34 to divide the casing into front and rear compartments 36 and 38, respectively. The front compartment 36 is normally closed by a cover 40 which is hinged at 41 to the casing 32, and normally releasably locked in closed position by latches (not shown) which are operated from the outside of the camera by knobs 42. The rear compartment 38 is normally closed by a cover 44 which is removably mounted on the casing 32 by means of screws 46 (Fig. 17) which are threaded into tapped holes in lugs 48 in the casing (Fig. 13). Housed in the casing 32 are the various operating devices of the camera. These may be termed as follows:

Film mounting provisions "A" (Figs. 3 and 4); A film exposing device "B" (Figs. 3, 4 and 14); A film feeding device "C" (Figs. 4, 10 and 11); A film take-up device "D" (Figs. 13 and 16); An actuator "E" for the devices "B," "C" and "D" (Figs. 13 and 14); Operating mechanism "F" for the actuator "E" (Figs. 13, 15 and 19); A film supply indicator "G" (Figs. 13 and 14); and Electrical control means "H" (Figs. 13 and 14).

*Film mounting provisions "A"*

Referring to Figs. 3, 4 and 15, there are provided in the front compartment 36 of the camera casing 32 a film-supply reel 50 and a film take-up reel 52. Reel 50, which holds a supply of non-exposed film 54, may be of conventional construction, having a square hole 56 for quick mounting on the square portion of a mounting shaft 58 which is suitably journalled in a boss 60 on the partition 34 of the casing 32 (Fig. 14). The film take-up reel 52 may be of the same construction as reel 50, and be mounted on a square portion of a drive shaft 62 which is journalled in a bushing 64 in the partition 34 (Fig. 16). The film portion extending between the two reels 50 and 52 is guided for linear movement in a track assembly T past an exposure station X (Figs. 4 and 17). The track assembly T comprises the track proper 66 which is held suspended from a mounting bracket 68 in spaced relation therewith by screws 70 and interposed spacers 72 (Figs. 4 and 7). The mounting bracket 68 is, in the present instance, in the form of an angle which is mounted at 74 on the partition 34 in the casing 32. Cooperating with the track 66 is a gate 76 which is hingedly mounted on the bracket 68 so as to be swingable to and from closing relation with the track. More particularly, the gate 76 has secured thereto at 78 longitudinally spaced L-shaped hangers 80 (Figs. 4 and 8) which are pivotally mounted at 82 on depending posts 84 on the bracket 68. The posts 84 may be secured to the bracket 68 by screws 86 (Fig. 7). Cooperating with the bevelled surface 88 of each hanger 80 is a leaf spring 90 which is mounted at 92 on the bracket 68 and holds the gate 76 in its closed position on the track 66, as will be readily understood from Fig. 8. Also secured by the screws 78 to the gate 76 adjacent the exit of the track 66 is the laterally extending end portion 98 of a handle 100 with which to open and close the gate 76 (Fig. 8).

The track 66 is provided throughout its length with a groove 102 which is slightly narrower than the width of the film 54 (Figs. 5 to 8), and with longitudinal recesses 104 on opposite sides of the groove 102 which are to receive the opposite side margins of the film 54 and thus locate the latter in the track. The longitudinal recesses 104 are of such depth that the film may, when the gate 76 is closed, freely slide therein. In order that the film 54 may be bared to the objective lens L of the camera at the exposure station X, the track 66 is there provided with an opening 106 which, in the transverse direction extends through a distance commensurate with the length of a photographic record on the film. Likewise, the bracket 68 is at the exposure station X provided with an opening 107 which is in alignment with the opening 106 in the track 66. In order to hold the film 54 flat in the track opening 106 at the exposure station X the same rests there on a pressure pad 108 (Fig. 6) which is yieldingly urged against the bottoms of the opposite recesses 104 in the track by a spring plate 112, interposed between the pad 108 and an offset end 114 of the gate 76 (see also Fig. 4). The pressure pad 108 has a lost motion connection 116 with the offset gate and 114 so that the pad will, on closure of the gate, reach its closed position on the track in advance of the gate, thereby facilitating the correct placement of the film in the track and the closure of the gate on the correctly placed film.

Near the opposite ends of the track 66, the film 54 is guided over fixed guide posts 120 and 122 (Figs. 4 and 14) which project from the partition 34 in the casing 32 and are so disposed as to hold the film therebetween in line with the fixed track 66. The track assembly T is normally covered at the front by a shield 124 (Figs. 3, 4 and 16 to 18) which is secured by screws 126 (Fig. 3) to the spacers 72 as well as to a post 128 which projects from a boss 130 on the partition 34 in the casing 32. The shield 124 serves to protect the track assembly T from the operator's hands when loading or unloading the camera, yet does not interfere with the correct placement of a new film in the track 66 since the gate 76 of the track assembly swings, when opened, below the shield 124 for admission of the new film strip into the track 66. To load or unload the camera, the front cover 40 thereof is opened, whereupon the gate 76 of the track assembly T is opened by depressing the handle 100 into the dot-and-dash line position shown in Fig. 8 without interference from the shield 124 which terminates short of the handle 100 as shown in Fig. 3. The reels 50 and 52 may then be removed from the camera and replaced with new reels. In mounting new reels in the camera, the leading end of the film on the supply reel is drawn out, placed into the track and wound on the take-up reel. The gate 76 of the track assembly T, as well as the front cover 40 of the camera, are thereupon closed. The handle 100 on the track gate 76 is arranged so as to be in the path of closing movement of the camera cover 40 when in its open, dot-and-dash line position shown in Fig. 8, and to permit closure of the camera cover when in the closed, full-line position shown in the same figure. Thus, the handle 100 acts as a safeguard against closing the camera cover 40 when the track gate 76 is inadvertently left open.

*Film exposing device "B"*

Located at, and suitably secured to, the bottom 140 of an external recess 142 in the camera casing 32 is a conventional mounting 144 for the camera lens L (Figs. 3, 4 and 17). The lens mounting 144 is immediately above the exposure station X. A fan-like shutter blade 148 is interposed between the lens mounting 144 and the track assembly T. The shutter blade 148 is mounted in any suitable manner, as by rivets 152, on an arm 154 (Fig. 17) which is rotatably mounted on a vertical stub shaft 156, journalled with its opposite ends in bearing brackets 158 on a mounting plate 160 which is secured by screws 162 to the partition 34 in the camera casing 32. The shutter blade 148 is in the present instance, made of flexible sheet metal and is provided with a clearance opening 164 through which the stub shaft 156 extends. The arm 154 and the shutter blade 148 straddle a collar 166 on the stub shaft 156. A combined torsion and compression spring 168 surrounds the stub shaft 156 and is interposed between, and anchored with its ends to, the shutter blade 148 and one of the bearing brackets 158, respectively, so as normally to urge the shutter blade against the collar 166 on the shaft 156, and to turn the shutter blade into the closed, full-line position shown in Fig. 14.

Since the large reductions required of the present camera make the reduction of lens aberrations to a minimum imperative, the angle which a photographic objective subtends at the lens must be as small as possible for it is a well-known fact that the image quality of photographic objectives deteriorates rapidly as the angle of view is increased, and that the image quality is best at the center of the image. With this in view, and since there are practical limitations to the spacing of the camera from the object plane, the lens L is set deep into the confines of the camera casing near the bottom thereof, i. e., into the recess 142, and the track assembly T is accordingly located close to the bottom of the camera casing. The partition 34 in the camera casing, which forms a side wall of the external recess 142 therein, serves, the same as the preferably curved side walls 170 of the recess 142, as a light shield to protect the camera lens from unwanted light. To complete the light-shielding of the camera lens, the front cover 40 of the camera is provided with a web 172 (Figs. 1, 2 and 17) which closes the recess 142 at the front of the camera.

*Film feeding device "C"*

As previously mentioned, the film used in the present camera is non-perforated at its side margins and, hence, unsuited for the well-known sprocket feed, neither is the film fed by cooperating rolls which may well mar the sensitized face thereof. Instead, the film is fed by a reciprocating device 175 (Figs. 4 and 10) which grips the film edgewise so that it may not do any harm to the same. The instant film-feeding device reciprocates in the direction of the film track 66 and is operative during its work stroke in the direction of the arrow 180 in Figs. 4 and 10, and inoperative during its return stroke in the opposite direction. The film-feeding device 175 reciprocates within a predetermined range longitudinally of the film track 66, and the latter as well as the film gate 76 are throughout the extent of this range reduced in width to the extent that the opposite side edges of the film extend laterally therebeyond in the manner shown in Figs. 9 to 12 for clamping engagement by the film-feeding device. The widthwise reduced length of the track 66 extends between the shoulders 184 (Fig. 4), while the widthwise reduced length of the gate 76 is even longer.

The film-feeding device 175 comprises opposite clamping jaws 186 and 188 of which the jaw 188 is formed by one leg of an L-shaped bracket 190 (Figs. 4 and 9). The other leg 191 of bracket 190 overlies, and is pivotally connected at 192 with a rocker 194 which rests on the track 66 (Fig. 9). Held suspended from, and in spaced relation with, the rocker 194 by means of screws 196 and a spacer 198 is a plate 200 which forms with the rocker 194 a fork 202 in which the other jaw 186 is pivotally mounted as at 204. Pivotally connected at 206 with the rocker 194 is a link 208 (Figs. 10 and 4) which is also pivotally connected at 210 with an operating element 212 (see also Fig. 16). The coordination of the pivots 192 and 204 is such that, on movement of the element 212 in the direction of the arrow 180 (in Fig. 10), the rocker 194 will first be turned counterclockwise as viewed in Fig. 10 about its pivot mounting 192 on the bracket 190, thereby moving the pivoted jaw 186 on the rocker 194 inwardly toward the adjacent side edge of the film until the latter becomes clamped between the jaws 186, 188. The film is thereupon fed in the direction of the arrow 180 on continued movement of the feeding device in the same direction. In order to obtain an instantaneous and reliable feed of the film during a work stroke of the feeding device 175, spaced knives 216 are preferably inserted in one of the jaws, jaw 186, for instance. The edges 218 of these knives 216 project slightly beyond the clamping face 220 of the jaw 186 (Fig. 11) and cut into the adjacent side edge 222 of the clamped film, thereby establishing a positive driving connection between the feeding jaws 186, 188 and the opposite side edges of the film.

At the very beginning of the return stroke of the film-feeding device 175, the jaw 186 is immediately rocked out of clamping engagement with the film 54, as will be readily understood, so that the clamping device 175 then rides idly over the film into the starting position for the next work stroke. The relative position of the parts of the film-feeding device 175 during the idle return stroke of the latter is illustrated in Fig. 12 and it will be noticed that the knives 216 are then retracted from the film. The rocker 194 is normally urged by a spring 224 into the position shown in Fig. 11 in which its associated clamping jaw 186 is in clamping engagement with the adjacent side edge of the film. More particularly, one end of the spring 224 is suitably anchored at 221 on the rocker 194, while the other end of the spring 224 extends through a hole 223 in the leg 188 of the bracket 190 (Fig. 11). As shown in Fig. 9, the superposed and pivotally connected rocker 194 and bracket 190 are located in the gap between the track 66 and the mounting bracket 68 and are retained therein by the clamping jaw 188 of the bracket 190 on the one side, and by the other clamping jaw 186 on the other side, of the track 66, and the parts of the film-feeding device 175 are so arranged that they do not interfere with the opening of the track gate 76 in any way.

*Film take-up device "D"*

As previously stated, the film 54 is, during each operating cycle of the camera, fed by the device "C" (Fig. 4) toward the take-up reel 52. In order that the exposed film may be wound on the take-up reel 52, the latter is driven in synchronism with the film feeding device "C." To this end, there is provided on the reel-carrying shaft 62 a clutch 230 of the silent type (Figs. 13 and 16), having a driving member 232 and a driven member 234. The driving clutch member 232 is journalled on an enlarged boss 236 of the bushing 64, while the driven clutch member 234 is freely rotatable on the drive shaft 62 and normally urged into frictional driving engagement with a collar 238 on the latter by means of a compression spring 240 which surrounds shaft 62 and is interposed between the driven clutch member 234 and a collar 242 on the shaft 62 (see also Fig. 18). The driving clutch member 232 pivotally carries at 244 eccentrically mounted pawls 246 which are in the form of small disks that are normally urged by an arcuate spring 248 into driving engagement with the periphery 250 of the driven clutch member 234. In accordance with the operating principle of clutches of the silent type, the pawls 246 of the present clutch will be in driving relation with the driven clutch member 234 when the driving clutch member 232 is turned clockwise as viewed in Fig. 13, and will ride idly over the periphery 250 of the driven clutch member 234 when the driving clutch member 232 is turned in the opposite direction. The driving clutch member 232 is operated in a manner described hereinafter. However, it may be stated in advance that the driving clutch member 232 is indexed during each operating cycle of the camera through an angular distance which is slightly in excess of that required of an empty take-up reel 52 in order to take up the length of film fed during each operation of the film-feeding device "C." In this way, the clutch 230 will overtravel the take-up reel 52, the excess rotation of the clutch being absorbed by slippage between the driven clutch member 234 and the collar 238 on the shaft 62. In this connection, it should be noted that the friction drive constituted by the driven clutch member 234 and the shaft collar 238 is insufficient to draw film from the supply reel 50, and that film is drawn from the supply reel 50 by the positive action of the film-feeding device "C."

As shown in Fig. 18, the reel-carrying shaft 62 extends through the rear cover 44 of the camera to the outside thereof and removably carries a knob 258 with which to turn the take-up reel 52 by hand in order to wind the usual leader of a new film on the take-up reel and thus condition the same for automatic wind-up of the film proper.

*Actuator "E" for devices "B," "C," and "D"*

Referring to Figs. 13, 14, and 16, there is provided a relatively long actuator bar 260 which is mounted for longitudinal sliding movement in spaced bearing brackets 262 on the mounting plate 160. The actuator bar 260 assumes the home position shown in Fig. 14 when the camera is at rest. In the home position of the actuator bar 260, an eccentrically mounted stop 263 on the latter engages one of the bearing brackets 262 (Fig. 13). Suitably mounted on the actuator bar 260 as at 264 is a cam plate 266 (Figs. 13, 14 and 17) which, on movement of the actuator bar 260 on its forward stroke to the right as viewed in Fig. 14, engages with its front shoulder 268 a rearwardly projecting tongue 270 on the closed shutter blade 148 and turns the latter into the open, dot-and-dash line position shown in Fig. 14 to bare the film at the station X to the camera lens L for a photographic exposure. The cam plate 266 is of such length that it will, during the forward stroke of the actuator bar 260, clear the tongue 270 of the shutter blade 148, permitting the latter to return to the closed, full-line position shown in Fig. 14 by the action of the spring 168 (Fig. 17). Hence the exposure time, i. e. the time during which the shutter blade 148 is open, depends on the speed of the actuator bar 260 on its forward stroke and the length of the cam plate 266. During return movement of the actuator bar 260 into the home position shown in Fig. 14, the tongue of the closed shutter blade 148 is cammed out of the way of the returning cam plate 266 by the incline 272 on the latter (see dot-and-dash line position of shutter blade 148 in Fig. 20). As soon as the cam plate 266 clears, during its return movement, the tongue 270 of the shutter blade 148 the same is again depressed by the spring 168 into its normal position, i. e. into the path of the cam plate 266 for the next forward stroke of the actuator bar 260. Inasmuch as only a front portion of the shutter blade 148 is secured at 152 to the arm 154 (Fig. 17), only the rear portion of the flexible shutter blade is cammed out of the way of the cam plate 266 when the actuator bar 260 returns to its home position.

Suitably mounted as by screws 276 on the actuator bar 260 is the operating element 212 for the film feeding device "C" (Figs. 13 and 16). In conformity with the previously described operation of the film feeding device "C," the actuator bar 260 will on its "return" stroke cause operation of the film-feeding device "C," whereas the latter will be moved idly when the actuator bar 260 is moving through its "forward" stroke.

The actuator bar 260 carries also a member 278 which is pivotally connected to a link 278', which is in turn pivotally connected at 280 with an arm 282, suitably secured to the driving member 232 of the clutch 230 on the reel-carrying shaft 62 (Figs. 13 and 17). In conformity with the previously described operation of the clutch 230, movement of the actuator bar 260 through its "return" stroke will result in engagement of the clutch 230 and consequent film take-up motion of the reel 52, while movement of the actuator bar 260 through its forward stroke will merely have the effect of causing the driving member 232 of the clutch 230 to over-ride the driven member 234 thereof.

*Operating mechanism "F" for the actuator "E"*

Recourse is had in the present instance to a simple and economically operating solenoid 290 as the prime mover for the actuator bar 260. The solenoid 290 is suitably mounted at 292 on an angle bracket 294 (Fig. 13) which is secured at 296 to the mounting plate 160. The driving connection between the core 298 of the solenoid 290 and the actuator bar 260 is as follows. Secured at 300 to the actuator bar 260 is an arm 302 (Fig. 13) the outwardly bent end 304 of which (Fig. 17) is received in a longitudinal slot 306 in one end of a plunger 308 (Fig. 15), and is preferably pinned to the latter as at 310 (Fig. 13) so as to be drivingly connected therewith. The other end of the plunger 308 has secured thereto, as at 312, a plate 314 (Fig. 15) which is notched on opposite sides as at 316 so as to straddle and be guided on the parallel legs 318 of a U-shaped connecter 320. The plunger 308 extends through the yoke 322 of the connecter 320, and the latter is slidable on the plunger. The connecter 320 is drivingly connected with the solenoid core 298 by means of a link 324 (Figs. 13 and 15). Also received and slidable on the plunger 308 is a plate 326 (Figs. 13, 15 and 17). Surrounding the plunger 308 and interposed between the plates 314 and 326 is a compression spring 328 which normally forces the yoke 322 of the connecter 320 into engagement with superposed felt and steel washers 330 and 332, respectively, which are mounted on the plunger 308 and bear against the arm 302 (Fig. 15). Secured at 336 to the mounting plate 160 is an L-shaped bracket 338 (see also Fig. 18) which is slotted at 340 to receive the connecter 320 and guide the same for movement longitudinally of the plunger 308 and of the solenoid core 298, the latter being co-axial with the former. The bracket 338 also acts as a retainer for another compression spring 342 which surrounds the connecter 320 and is interposed between the bracket 338 and the plate 326 (see also Fig. 17).

The spring 328 between the plunger 308 and the connecter 320 acts as a resilient link between them and permits, on energization of the solenoid 290, instant electro-magnetic retraction of the solenoid core 298 without corresponding quick motion of the actuator bar 260, as will be readily understood. Thus, a condition resembling that shown in Fig. 19 may arise, where the solenoid 290 has just been energized and the core 298 retracted so rapidly that the springs 328 and 342 were compressed before spring 328 could overcome the inertia of the plunger 308 and all the parts connected therewith. Hence, only on subsequent expansion of the compressed spring 328 will the plunger 308, the actuating bar 260 and the parts connected therewith follow the retracted solenoid core 298, which will remain retracted during continued energization of the solenoid 290. Since in the present camera the inertia of the plunger 308, actuating bar 260 and parts connected therewith is, however, insufficient to cause, on electro-magnetic retraction of the solenoid core 298, the delay in their follow-up motion to the extent suggested in Fig. 19, and since delay in their follow-up motion to that extent is essential to the proper operation of the camera, recourse is had to a motion-delaying device in the form of an inertia mechanism 350 (Figs. 13, 14 and 18). This mechanism comprises an inertia wheel 352 of considerable mass which is suitably frictionally mounted on a stub shaft 354, journalled in a frame 356 which is formed by side plates 358, held in spaced relation with each other and with the mounting plate 160, and mounted on the latter, by means of screws 360 and spacers 362. Mounted on the stub shaft 354 is a pinion 364 which is in permanent mesh with a relatively large gear 366, mounted on a stub shaft 368 which is also journalled in the frame 356 and carries a pinion 370 which is in constant mesh with a rack bar 372, secured at 374 to the actuator bar 260. It follows from Figs. 13 and 14 that the speed ratio between the pinions 370 and 364 in the drive between the rack bar 372 and the inertia wheel 352 is quite considerable, wherefore some time elapses before the inertia of the wheel 352 is overcome and the latter is accelerated to a point at which the actuator bar 260 moves, at the end of its stroke in either direction, at a permissible maximum speed, so that the actuator bar 260 may properly perform its designated functions of causing the operation of shutter blade 148, film-feeding device C and film take-up device D.

Film supply indicator "G"

As best shown in Fig. 14, there is journalled in opposite bosses 380 on the partition 34 a shaft 382 which carries in the front compartment 36 of the camera casing a film-supply test finger 384 (see also Fig. 3). The finger 384 projects into the film-supply reel 50 and is yieldingly urged against the roll of film 54 thereon by means of a torsion spring 386 which surrounds the shaft 382 and is anchored with one end on one of the bosses 380 and with the other end on a rocker 388 which is clamped at 390 to the shaft 382 (Fig. 14). Also mounted on the shaft 382 is an indicator plate 392 which carries graduations 394 (Fig. 13) that are in cooperative alignment with a window or opening 396 in the rear cover 44 (Fig. 13). In the example shown in Fig. 13, the graduation marked "C" appears through the window 396 in the rear cover 44, in which position of the indicator plate 392 the test finger 384 assumes the dot-and-dash line position shown in Fig. 13 in which the film-supply roll 50 in the camera is exhausted. The other graduations 394 on the indicator plate 392 may be marked (not shown) to indicate the footage of film left in the film-supply reel 50 when any one of these graduations appears behind the window 396.

The test finger 384, by yieldingly engaging the roll of film 54 on the supply reel 50, also acts as a brake on the latter and acts to prevent overtravel of film therefrom during and after each operation of the film-feeding device C. The test finger 384 has a branch finger 400 (Figs. 3 and 14) which extends in front of the film-supply reel 50, and serves not only as a convenient handle for rocking the test finger 384 out of an exhausted supply reel 50 for removal of the latter from the camera, but also as a safeguard against attempts to remove an exhausted supply reel from the camera while the test finger 384 still projects thereinto.

Electrical control means "H"

Referring to Figs. 13 and 14, there is mounted in a suitable frame 402 in the rear compartment 38 of the camera casing a normally closed snap switch 404, having an actuating blade 406 with which cooperates a switch actuator 408, pivotally mounted at 410 in the frame 402. The actuator 408 has a V-shaped end 412 adjacent the switch blade 406, and the pivot mounting 410 of the actuator 408 is situated to one side of the center line of the latter, so that the switch 404 is in its normally closed position when the actuator 408 assumes the full line position shown in Fig. 13, and the switch 404 is opened by the actuator 408 when the latter assumes the dot-and-dash line position shown in the same figure. The actuator 408 is shifted into the two positions shown in Fig. 13 by adjustable screws 414 and 416, respectively, which are threadedly received in the spaced parallel legs 418, respectively, of a U-shaped bracket 420, the yoke 422 of which is secured at 424 to the arm 302 and the member 278 in the manner best shown in Fig. 14.

The switch 404 is in circuit with the winding 426 (Fig. 13A) of the solenoid 290, and this circuit comprises any suitable power line 428, a lead 430, a conventional hand or push-button operated switch 432, a lead 434, the snap switch 404, a lead 436, the solenoid winding 426, and a lead 438. In the home position of the camera (Fig. 13), the actuator bar 260 is in its retracted or home position, and the switch actuator 408 has, during the preceding return stroke of actuator bar 260 into home position, been rocked by the screw 416 into the full-line position shown in Fig. 13, in which the switch 404 is in its normally closed position. Hence, the described circuit through the solenoid winding 426 will be closed on manipulating switch 432 (Fig. 13A), resulting in electro-magnetic retraction of the solenoid core 298 and movement of the actuator bar 260 through its forward stroke in the previously described manner. Toward the end of the forward stroke of the actuator bar 260, the screw 414 will engage and rock the actuator 408 into the dot-and-dash line position shown in Fig. 13, in which the switch 404 will be opened and the circuit through the solenoid winding 426 interrupted, resulting in return of the actuator bar 260 and parts connected therewith into home position by the action of the compression spring 342, as will be readily understood. Toward the end of the return stroke of the actuator bar 260 into home position, the screw 416 will engage and rock the actuator 408 into the full-line position, thereby restoring the switch 404 to its normally closed position for the next operating cycle of the camera.

Suitably mounted on a bracket 440 on the mounting plate 160 (Figs. 13 and 14) is another snap switch 442 which is normally open and in circuit with an "empty" light 444 (Fig. 13), said circuit comprising the same power line 428, a lead 446, the switch 442, lead 448, the "empty" light bulb 444, and a lead 450. Adapted to close the switch 442 and thereby close the circuit through the "empty" light 444, is an adjustable set screw 452 on the rocker 388. Closure of the switch 442 takes place when the test finger 384 assumes the dot-and-dash line position shown in Fig. 13 in which the film supply reel 50 is exhausted. Thus, the "empty" light 444 goes on when the film-supply in the camera is exhausted.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent, is:

1. In a camera, the combination with a lens, a normally closed shutter therefor, and means for guiding film for movement past said lens, of an actuator reciprocable from and normally urged into a predetermined home position, a device operatively connected with said actuator for feeding the guided film in one direction on movement of said actuator into home position, and means also operatively connected with said actuator for opening said shutter temporarily on movement of said actuator from home position, a solenoid having a movable core, an elastic driving connection between said actuator and core for moving said actuator from home position on energization of said solenoid, an inertia device turnable in opposite directions, and a driving connection between said actuator and inertia device turning the latter in opposite directions on movement of the former in opposite directions, respectively, thereby to retard movement of said actuator in either direction.

2. In a camera, the combination with a lens, a normally closed shutter therefor, and means for guiding film for movement past said lens, of an actuator reciprocable from and normally urged into a predetermined home position, a device operatively connected with said actuator for feeding the guided film in one direction on movement of said actuator into home position, means also operatively connected with said actuator for opening said shutter temporarily on movement of said actuator from home position, a solenoid having a movable core, an elastic driving connection between said actuator and core for moving said actuator from home position on energization of said solenoid, an energizing circuit for said solenoid including a manually operable first switch and another, normally closed snap switch in series connection with said first switch, a pivoted member rockable into two positions in one of which it opens said other switch, and spaced projections on said actuator, one of said projections rocking said member into said one position at the end of the actuator movement away from home position to the maximum extent permitted by the energized solenoid, and the other projection rocking said member into the other position at the end of the actuator movement into home position.

3. The combination of a track for guiding film having straight uninterrupted side edges, said track having provisions for preventing buckling of the guided film in the direction of its thickness, and a device for feeding the film in said track, said device comprising companion jaws having opposite clamping surfaces, respectively, and being movable in unison longitudinally of said track in opposite directions, said jaws being also relatively movable in the plane of the guided film transversely of its length to and from each other to bring their respective clamping surfaces into and from clamping engagement, respectively, with the respective adjacent side edges of the guided film, means for moving said jaws in unison longitudinally of said track in opposite directions, means for relatively moving said jaws to and from each other, and a knife blade projecting from the clamping surface of one of said jaws and having a cutting edge extending transversely of the adjacent side edge of the guided film for cutting into said adjacent film edge on relative movement of said jaws toward each other.

4. The combination of a track for guiding film having straight uninterrupted side edges, said track having provisions for preventing buckling of the guided film in the direction of its thickness, and a device for feeding the film in said track, said device comprising companion jaws having opposite clamping surfaces, respectively, and being movable in unison longitudinally of said track in opposite directions, said jaws being also relatively movable in the plane of the guided film transversely of its length to and from each other to bring their respective clamping surfaces into and from clamping engagement, respectively, with the respective adjacent side edges of the guided film, means for moving said jaws in unison longitudinally of said track in oppostie directions, means for relatively moving said jaws to and from each other, and a knife blade projecting from the clamping surface of one of said jaws at an inclination to the adjacent side edge of the guided film, said knife blade having a cutting edge extending transversely of the adjacent side edge of the guided film for cutting into said adjacent film edge on relative movement of said jaws toward each other and movement of the latter in unison longitudinally of said track in one direction.

5. The combination of a track for guiding film having straight uninterrupted side edges, and a device for feeding the film in said track, said device comprising a member guided for movement longitudinally of said track and having a clamping surface adapted to be engaged by the adjacent side edge of the guided film, a rocker pivotally mounted on said member for turning movement about an axis transverse to the plane of the guided film, a jaw pivotally mounted on said rocker for turning movement about an axis parallel to, but spaced from, the pivot axis of the latter and having a clamping surface moving into and from clamping engagement with the adjacent side edge of the guided film on turning said rocker in opposite directions, respectively, and means operatively connected with said rocker remote from its pivot axis for moving said member in either direction longitudinally of said track.

6. The combination set forth in claim 5, further comprising means normally yieldingly urging said jaw into clamping engagement with the adjacent film edge.

7. The combination set forth in claim 5, further comprising a knife blade projecting from the clamping surface of said jaw and having a cutting edge extending transversely of the adjacent film edge for cutting into the latter on movement of said last mentioned clamping surface toward the adjacent film edge.

8. The combination set forth in claim 5, further comprising a knife blade slightly projecting from the clamping surface of said jaw and having a cutting edge extending transversely of the adjacent film edge, said knife blade being so inclined to the clamping surface of said jaw that its cutting edge enters the adjacent film edge obliquely on movement of said last mentioned clamping surface toward the adjacent film edge.

9. In a camera, the combination of a track for guiding film having straight uninterrupted side edges, a device for feeding the film in said track, said device comprising a member guided for movement longitudinally of said track and having a clamping surface adapted to be engaged by the adjacent side edge of the guided film, a rocker pivotally mounted on said member for turning movement about an axis transverse to the plane of the guided film, a jaw pivotally mounted on said rocker for turning movement about an axis parallel to, but spaced from, the pivot axis of the latter and having a clamping surface moving into and from clamping engagement with the adjacent side edge of the guided film on turning said rocker in opposite directions, respectively, an actuator reciprocable from and normally urged into a predetermined home position, a driving connection between said actuator and said rocker remote from the pivot axis of the latter for moving said member in opposite directions longitudinally of said track on movement of said actuator to and from home position, respectively, a solenoid having a movable core, an elastic driving connection between said core and actuator for moving the latter from home position on energization of said solenoid, an inertia device turnable in opposite directions, and a driving connection between said actuator and inertia device turning the latter in opposite directions on movement of the former in opposite directions, respectively, thereby to retard movement of said actuator in either direction.

PHILIP J. BROWNSCOMBE.

REFERENCES CITED

The following references are of record in the file of this patent:

UNITED STATES PATENTS

| Number | Name | Date |
|---|---|---|
| 562,222 | Granger | June 16, 1896 |
| 929,161 | Oehring | July 27, 1909 |
| 975,278 | Pond | Nov. 8, 1910 |
| 1,090,413 | Rhodes | Mar. 17, 1914 |
| 1,174,266 | Moses, Jr. | Mar. 7, 1916 |
| 1,357,391 | Freytag | Nov. 2, 1920 |
| 1,830,168 | Josepho | Nov. 3, 1931 |
| 2,111,425 | Goldhammer | Mar. 15, 1938 |
| 2,168,987 | Hopkins | Aug. 8, 1939 |
| 2,232,290 | Janes | Feb. 18, 1941 |
| 2,233,389 | Kende et al. | Feb. 25, 1941 |
| 2,246,034 | Elison | June 17, 1941 |
| 2,278,196 | Fluharty | Mar. 31, 1942 |
| 2,284,487 | Hineline | May 26, 1942 |
| 2,338,657 | Mihalyi | Jan. 4, 1944 |
| 2,388,423 | Langdon | Nov. 6, 1945 |
| 2,395,828 | Kallusch | Mar. 5, 1946 |
| 2,451,467 | Bickel | Oct. 19, 1948 |

FOREIGN PATENTS

| Number | Country | Date |
|---|---|---|
| 388,454 | Germany | Jan. 14, 1924 |
| 354,170 | Great Britain | July 27, 1931 |